United States Patent [19]

Yeakey et al.

[11] 4,162,931
[45] Jul. 31, 1979

[54] METHOD EMPLOYING POLYAMIDE THERMOPLASTIC ADHESIVES

[75] Inventors: Ernest L. Yeakey; Harold G. Waddill, both of Austin, Tex.

[73] Assignee: Texaco Development Corp., White Plains, N.Y.

[21] Appl. No.: 851,013

[22] Filed: Nov. 14, 1977

Related U.S. Application Data

[60] Division of Ser. No. 659,873, Feb. 20, 1976, Pat. No. 4,128,525, which is a continuation-in-part of Ser. No. 528,458, Nov. 29, 1974, abandoned.

[51] Int. Cl.² .............................................. C09J 5/00
[52] U.S. Cl. .................................... 156/331; 156/330; 260/32.6 NA; 428/414; 428/474; 528/341; 525/423
[58] Field of Search ............... 156/330, 331; 428/414, 428/474; 260/32.6 NA, 830 P, 75 N, 78 R, 584 B, 857 PG; 528/341

[56] References Cited

U.S. PATENT DOCUMENTS

| | | | |
|---|---|---|---|
| 2,597,855 | 5/1962 | Czarnecki | 428/458 |
| 3,236,895 | 2/1966 | Lee et al. | 260/78 R |
| 3,462,337 | 8/1969 | Gorton | 156/331 |
| 3,471,590 | 10/1969 | Wittbecker | 260/78 R |
| 3,654,370 | 4/1972 | Yeakey | 260/548 B |
| 3,714,289 | 1/1973 | Schober et al. | 260/830 P |
| 4,070,225 | 1/1978 | Batdorf | 156/331 |

*Primary Examiner*—John T. Goolkasian
*Assistant Examiner*—J. J. Gallagher
*Attorney, Agent, or Firm*—Carl G. Ries; Thomas H. Whaley; James L. Bailey

[57] ABSTRACT

Novel thermoplastic adhesive components, prepared from inexpensive and readily available synthetic materials, having melting points between about 20° C. to about 180° C. and broad ranges of hardness, flexibility and compatibility are disclosed. The novel thermoplastic compounds useful in adhesive formulations are comprised of a resinous polyamide reaction product of a polyoxypropylene polyamine having an average molecular weight of from about 190 to about 3,000 and being selected from diamines, triamines, or mixtures thereof, piperazine and an aliphatic or aromatic dicarboxylic acid, ester or anhydride having from about 4 to about 20 carbon atoms per molecule. The resinous polyamide reaction product is prepared by mixing and reacting the polyoxypropylene polyamine, piperazine, and dicarboxylic acid materials in a total amine:acid molar ratio within the range of from about 0.25:1.0 to about 4.0:1.0 at a temperature of from about 175° C. to about 270° C. The inventive thermoplastic polyamides can be formulated with compatible plasticizing agents to prepare a useful adhesive to which can also be added other components, such as a minor amount of a polyepoxide resin having an epoxide equivalent weight of about 150 to about 600, fillers and the like to produce thermoplastic adhesive formulations having desired hardness, flexibility and compatibility that are capable of bonding together a variety of substrates.

1 Claim, No Drawings

METHOD EMPLOYING POLYAMIDE THERMOPLASTIC ADHESIVES

CROSS-REFERENCE TO RELATED APPLICATION

This is a division of application Ser. No. 659,873, filed Feb. 20, 1976 now U.S. Pat. 4,128,525 which in turn is a continuation-in-part of application Ser. No. 528,458 filed 11-29-74, now abandoned.

A commonly assigned, co-pending application entitled "Thermoplastic Adhesives", Ser. No. 622,311, filed Oct. 14, 1975, now abandoned in the name of Howard P. Klein, teaches a novel thermoplastic adhesive compound having a melting point of between about 20° C. to about 180° C. which is comprised of a resinous polyamide reaction product of a polyoxypropylene polyamine having an average molecular weight of about 190 to about 3,000 selected from diamines, triamines, or mixtures thereof, and an aliphatic or aromatic dicarboxylic acid, ester or anhydride having from about 4 to about 20 carbon atoms per molecule, prepared by mixing and reacting the polyamine and the dicarboxylic acid material in molar ratios of from about 0.25:1.0 to about 4.0:1.0 polyamine:acid at a temperature of from about 175° C. to about 270° C. The thermoplastic adhesive compounds of the instant application are prepared with the addition of piperazine to prepare the thermoplastic adhesive compositions of this invention.

BACKGROUND OF THE INVENTION

This invention relates to thermoplastic adhesives, or hot-melt adhesives, and more particularly pertains to novel thermoplastic adhesives which include a resinous polyamide reaction product prepared from relatively inexpensive and readily available synthetic materials which have broad ranges of melting temperatures and exceptional adhesive properties.

DESCRIPTION OF THE PRIOR ART

The employment of polyamide reaction products of certain aliphatic polyamines and vegetable or animal based long-chain dimer or trimer fatty acids and related materials as thermoplastic or hot-melt adhesive components for the bonding of a multitude of materials, such as leather, textiles, wood, synthetic laminates, and the like, is well-known as shown by U.S. Pat. No. 2,969,555. Generally speaking, thermoplastic adhesives are prepared by the condensation reaction at elevated temperatures of aliphatic polyamines such as ethylenediamine, diethylenetriamine, hexamethylene diamine, and other similar aliphatic polyamines having primary and/or secondary amine groups, and a vegetable or animal-based polymerized polyene fatty acid, ester or anhydride prepared by the thermal polymerization of fatty oils containing glycerides of polymerizable fatty acids such as soybean oil, linseed oil, cottonseed oil, castor oil, and the like. The polyamide reaction products are prepared by heating such admixtures at temperatures which readily produce polyaminolysis of the fatty esters or dehydration of the polyamine salt of the fatty acids, as described in U.S. Pat. No. 2,450,940 to Cowan, et al.

It is also known that the aforementioned polyamide reaction products can be formulated with other components, e.g., polyepoxide resins, to provide hot-melt formulations for tailored systems exhibiting certain desired physical properties, such as melting points, hardness, flexibility, and compatibility. For example, U.S. Pat. No. 2,867,592 to Morris, et al. describes an improved thermoplastic adhesive for use in rod form which contains an admixture of a polyamide reaction product of an alkylene polyamine and a vegetable-based polymerized fatty acid, ester or anhydride and a minor amount of a resinous polyepoxide. Patentees teach that the addition of the resinous polyepoxide increases the dimensional stability and strength of the thermoplastic adhesive during preparation and use.

However, the vegetable and animal based long-chain dimer or trimer fatty acid materials conventionally employed in the preparation of polyamide-based thermoplastic adhesives have become increasingly short in supply due to market demands and are continuously increasing in price. Moreover, the aliphatic polyamine compounds generally employed for the preparation of these thermoplastic adhesives, mentioned hereinabove, are also in great quantities as curing agents for polyepoxide resins, synthetic intermediates, and the like, thus making them more obtainable and expensive in thermoplastic adhesive manufacture.

Driven by the need for a satisfactory replacement for these naturally derived materials, we have discovered that thermoplastic adhesives having broad ranges of hardness, flexibility and compatibility, and which are capable of bonding together a variety of substrates can be prepared from synthetic materials that are more economical and readily available than those heretofore employed and hereinbefore mentioned. These novel thermoplastic adhesive compounds are comprised of the resinous polyamide reaction product of a polyoxypropylene polyamine having an average molecular weight of about 190 to about 3,000 and a short chain aliphatic or aromatic dicarboxylic acid, ester or anhydride having from about 4 to about 20 carbon atoms per molecule as more particularly described in the Klein, commonly assigned copending application referred to hereinabove. We have now further discovered that the adhesive strength of the thermoplastic adhesive compounds described in this co-pending application can be greatly improved by the employment of piperazine in their preparation. We are unaware of any literature describing the employment of piperzine for the improvement of adhesive strength of thermoplastic adhesive materials comprised of polyamide reaction products.

SUMMARY OF THE INVENTION

The present invention is a compound useful as a thermoplastic adhesive component having a broad range of hardness, flexibility, and compatibility and is capable of bonding together a variety of substrates with improved adhesive strength which is comprised of a resinous polyamide reaction product of a polyoxypropylene polyamide selected from diamines, triamines, or mixtures thereof having an average molecular weight of from about 190 to about 3,000, piperazine and an aliphatic or aromatic dicarboxylic acid, ester or anhydride having from 4 to about 20 carbon atoms per molecule. The thermoplastic adhesive compound is prepared by mixing and reacting the polyoxypropylene polyamine, piperazine and dicarboxylic acid material in a molar ratio of about 0.25:1.0 to about 4.0:1.0 moles total amine:moles acid material, wherein the piperazine is present in an amount of up to about 80 molar percent, based upon the total molar amount of amine present, at a temperature of about 175° C. to about 270° C. The reaction time is preferably within the range of about 1 to about 12 hours. The improved thermoplastic compounds of the invention thus produced have broad melting ranges of about 20° C. to about 180° C. and can be added to compatible plasticizers to produce adhesives and can also be formulated with other components such as a liquid polyepoxide resin having an epoxide equivalent weight of from about 150 to about 600, filler and the like, to produce thermoplastic adhesive formulations having particularly desirable properties for use in tailored systems for bonding a variety of substrates. The thermoplastic adhesive compounds of the invention exhibit unexpectedly high adhesive strengths.

DETAILED DESCRIPTION OF THE INVENTION

Polyoxypropylene polyamines, and procedures for their preparation, useful in producing the thermoplastic adhesives of the invention are well-known and amply described in literature. See, for example, U.S. Pat. No. 3,654,370. Polyoxypropylene polyamines are known to be particularly useful as curing agents for polyepoxide resins as illustrated in U.S. Pat. No. 3,462,393. We have found that these polyamine materials, when used in the preparation of the polyamide reaction product of the present invention, produce new and unexpected hot-melt adhesives.

Preferably, we employ polyoxypropylene diamines of the formula:

wherein x is an integer of from about 2 to about 40, and polyoxypropylene triamines of the formula

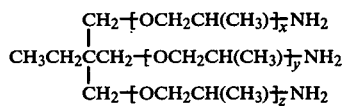

where x, y and z represent integers in the range of about 1 to 15, and the sum of x, y and z is from about 3 to about 50. The most preferred polyoxypropylene diamines of the formula have average molecular weights between about 230, where x is an average of 2.6 to about 2,000 where x is an average of about 33.1. Preferred polyoxypropylene triamines of the above formula have average molecular weights between about 190 to about 3,000. These polyoxypropylene di- and triamines are readily available commercially in a wide variety of molecular weight ranges, such as those sold by Jefferson Chemical Company, Inc., Houston, Texas, under the trademark JEFFAMINE ®.

The above-described polyoxypropylene polyamine and piperazine, the employment of which is described in more particularity hereafter, can be reacted with any known aliphatic or aromatic dicarboxylic acid, ester or anhydride compound having from about 4 to about 20 carbon atoms per molecule. As well-known in the art, dicarboxylic acids and related corresponding esters and anhydrides react with amines in substantially the same manner. Therefore, for the purposes of brevity only, these materials will hereinafter be referred as dibasic acids. Unexpectedly, we have found that the relatively readily available dibasic acids react easily with the described polyoxypropylene polyamines and piperazine to provide the unexpected hot-melt adhesives of the invention. The preferred aliphatic dibasic acids have a divalent, saturated, unsubstituted hydrocarbon group, while the preferred aromatic dibasic acids include an unsubstituted phenylene group. Examples of preferred dibasic acids and related materials include adipic, azelaic, sebacic, isophthalic, and terephthalic acids, phthalic and succinic anhydrides, and dimethylterephthalate esters, to name a few. The dibasic acids useful in the invention are relatively inexpensive and are readily available commercially. However, they have not heretofore been employed in the preparation of thermoplastic adhesives comprised of polyamide resins inasmuch as polyamide reaction products prepared therefrom have excessively high melting points and high rigidity. Moreover, such polyamide resins are normally incompatible with other components conventionally employed in the preparation of thermoplastic adhesive formulations such as polyepoxide resins. In view of these known disadvantages, the thermoplastic adhesive composition of the present invention was most unexpected.

The third essential ingredient of the thermoplastic adhesive composition of the present invention is piperazine. We have discovered that the employment of piperazine in the preparation of the inventive resinous polyamide reaction product provides greatly improved adhesive strength, yet other physical characteristics such as flexibility, melting points, hardness and the like are not adversely affected whatsoever. Heretofore, piperazine has not been considered useful in the preparation of thermoplastic resins. However, our discovery provides increased flexibility in the employment of thermoplastic adhesives prepared from the above-described polyoxypropylene polyamines and dibasic acids for the production of thermoplastic adhesive formulations which can be tailored with particularly desirable physical properties.

More particularly, the resinous polyamide reaction product of the present invention is prepared by mixing the above-described polyoxypropylene polyamine and piperazine with the above-described dibasic acid at a temperature of between about 175° C. to about 270° C. The polyamines and acid compounds are preferably mixed in total polyamine:acid molar ratios of from about 0.8:1.0 to about 1.25:1.0 with substantially equimolar ratios being especially preferred. The admixture is usually heated for several hours, i.e., from about 1 to about 12 hours, at maximum temperature to complete the reaction, while by-product water or alcohol, depending upon the particular compounds employed, is removed. Preferably, the reaction mixture is vacuum stripped by known procedures to develop optimum molecular weight.

The piperazine can be added before, during or after the above-described polyoxypropylene polyamine is added to the above-described dibasic acid. It is preferred that all three components of the resin are mixed together and reacted at once. The piperazine is added in an amount of about 10 to about 80 molar percent, preferably about 30 to about 70 molar percent, based upon the total molar amount of amine required for the formulation, set forth hereinabove. Accordingly, the amount of polyoxypropylene polyamine employed is reduced to provide the above-described molar ratios of total polyamine:acid which can be readily determined by one having ordinary skill in the art without undue experimentation.

The polyoxypropylene-dibasic acid-piperazine polyamide polymers are random polymers which have a molecular weight less than about 10,000, and normally have a molecular weight ranging from about 2,000 to about 10,000. It is important that the molecular weight of the polyamide be within the just mentioned range in order that it possess proper utility as an adhesive component. Such polyamides of molecular weight lower than 10,000 have the requisite relatively low melting point whereupon heating a hot melt can be achieved which upon rapid cooling forms the desired strong adhesive bond. Polyamides having a molecular weight substantially in excess of 10,000 do not meet this criteria. Even more importantly, it is necessary that the polyamide polymer have such relatively low molecular weight in order that it can be properly formulated with other adhesive components, and particularly plasticizers. It is necessary that the polyamide be soluble or compatible with such plastizicer components. Examples of compatible plasticizers which may be used with the polyamides here to prepare useful thermoplastic adhesives include toluene sulfonamides, dibutyl phthalates, or short chain polyfunctional polyols. The amount of compatible plasticizer used to prepare the inventive thermoplastic adhesive ranges from about 5 to about 50 weight percent based on the weight of the adhesive formulation including the polyamide compound, with about 10 to about 40 weight percent being optimum.

It is also important that the polyamides have a proper molecular weight below about 10,000 in order that they exhibit proper flexibility as an adhesive component. Again, polyamides of molecular weight substantially above 10,000, say about 30,000 or above, molecular weight are too rigid to be useful as thermoplastic adhesives. Such polyamides formed from blocks of the nylon type while useful as fibers have been found to be completely unsuitable as a thermoplastic adhesive component.

In a preferred embodiment, the above-described inventive resinous polyamide reaction product is formulated along with a plasticizer with about 1 to about 25 weight pecent, based upon the total formulation weight, of a polyepoxide resin at a temperature above the melting points of each component, e.g., within the range of about 20° C. to about 180° C. The polyepoxide resin component employed is preferably one that is conveniently used in preparing thermoplastic adhesives. Such polyepoxides are well-known complex resinous materials and are generally prepared by the reaction of polyhydric organic compounds with a polyfunctional chlorhydrin. References which describe in detail methods for preparing the epoxy resins of the type concerned here include "Epoxy Resins", by Lee and Neville, McGraw-Hill Book company, Inc., (1957), and "Epoxy Resins", by Irving Skeist, Reinhold Publishing Company (1958). The particularly preferred polyepoxide resins are the polyglycidyl ethers of polyhydric phenols, such as the diglycidyl ether of resorcinol, the triglycidyl ether of phloroglucinol, the tetraglycidyl ether of tetraphenylolethane or the polyglycidyl ether of a phenolformaldehyde novolac. Especially preferred is the diglycidyl ether of 4,4'-isopropylenediphenol, generally known as bisphenol A, containing a minor amount of cogeneric materials of higher molecular weight and having an epoxide equivalent weight (grams of resin containing 1 equivalent epoxide) of approximately 175 to about 190.

The inventive resinous polyamide reaction compound will normally contain several unreacted amine and carboxyl groups. It is believed that these unreacted groups react with the epoxy group of the substantially added polyepoxide resin and enhances the tensile strength of the adhesive formulation. Thus, preferably, the resinous polyamide reaction product component will contain a total amine content of about 0.1 to about 2.0 meq./g. and will have an acid number of between about 2 to about 20. The total amine content and acid number can be readily controlled during the preparation of the polyamide reaction product as described hereinabove by known procedures and both can be readily determined by well-known analytical procedures.

Preferably, the polyepoxide resin component is added to the resinous polyamide reaction product and plasticizer composition in an amount of from about 5 to about 25 weight percent, based upon the total weight of the formulation. The specific amount employed is dependent upon the epoxide equivalent weight of the polyepoxide resin and the total amine content and acid number of the polyamide reaction product and should be an amount which will not produce gelation. The specific amount for given components can be readily determined by one having ordinary skill in the art with only minor experimentation using known procedures, such as that described in U.S. Pat. No. 2,867,592, which is incorporated herein by reference. The experimentation described therein includes heating a series of resinous polyamide components containing varying amounts of polyepoxide resin to 150° C. in 1-inch glass tubes and dropping a 3/16-inch steel ball therein. Gelation is defined therein as the state whereby the steel ball will not fall or will not fall regularly through the resinous component.

In an especially preferred embodiment of the invention, a diglycidyl ether of bis-phenol A having an epoxide equivalent weight of about 175 to 190 is added to the above-described polyamide reaction product in an amount of about 5 to about 25 weight percent, based upon total formulation weight, while the resinous polyamide component is heated at about 100° C. to about 130° C. Upon cooling, the resulting compound does not exhibit gelation and has a melting point between about 100° C. to about 180° C., depending upon the compounds employed in the preparation of the resinous polyamide reaction product component.

Moreover, compatible fillers can be employed if desired in amounts from 0 percent up to about 30 weight percent without reducing the adhesive properties or other physical characteristics of the inventive compound. In fact, compatible fillers have been found to increase the adhesion bond when the adhesive compounds are applied to certain substrates by reducing thermal expansion, thus reducing strain during curing of the system. Examples of compatible fillers include fumed silica, calcium carbonate, kaolin clays, alumina or titanium oxides, and the like.

The following examples illustrate the invention in more detail, but are not to be construed as limitative. JEFFAMINE ® is the registered trademark for polyoxypropylenedi- and triamines sold by Jefferson Chemical Company, Inc., Houston, Texas.

EXAMPLES I-III

Three thermoplastic adhesive formulations were prepared employing the compounds set forth in the following Table 1. The resinous polyamide reaction product compounds employed in the Examples of Table 1 were prepared by admixing the described polyamine components with isophthalic acid in the described molar ratios and heating the admixtures at a temperature of 200°–240° C. for 6–8 hours with continuous removal of water. The reaction product mixtures were vacuum stripped during the last stages of reaction to develop the optimum molecular weight. The resinous polyamide reaction product components were then mixed at a temperature of about 120°–140° C. with the designated amounts of polyepoxide resin (diglycidyl ether of bis-phenol A, epoxide equivalent weight of 182–189), plasticizer and fillers. Glass beads were added to each formulation to insure even coat-ing between substrates. Each formulation was then coated between the designated substrates in a liquid state and allowed to solidify. The adhesion values are set forth in Table 1.

Table 1

| Example No. | I | II | III |
|---|---|---|---|
| Polyamide (1) | 100 | — | — |
| Polyamide (2) | — | 100 | — |
| Polyamide (3) | — | — | 100 |
| Liquid DGEBA epoxy resin (EEW 182–189) | 15 | 15 | 15 |
| Plasticizer (4) | 45 | 45 | 15 |
| Fumed silica (5) | 1.5 | 1.5 | 1.5 |
| Glass beads, 0.0035" dia. | 0.3 | 0.3 | 0.3 |
| Tensile shear strength, psi (ASTM D1002) | | | |
| Aluminum-to-aluminum | 2150 ± 190 | 1520 ± 50 | 2590 ± 420 |
| Steel-to-steel | 2530 ± 80 | 2360 ± 340 | 1895 ± 60 |
| Laminate-to-laminate (6) | 880 ± 60 | 780 ± 60 | 920 ± 60 |
| Wood-to-wood | 360 ± 40 | 300 ± 40 | — |

(1) Prepared from JEFFAMINE ® D-400, a polyoxypropylene diamine having an average molecular weight of 400 (Jefferson Chemical Company, Inc.): piperazine:isophthalic acid; molar ratio 0.3:0.7:0.9.
(2) Prepared from JEFFAMINE ® D-230, a polyoxypropylene diamine having an average molecular weight of 230 (supra): isophthalic acid; molar ratio 1.01 to 1.0.
(3) Prepared from JEFFAMINE ® D-400 (supra): piperazine:isophthalic acid; molar ratio 0.5:0.5:0.9.
(4) N-ethyl, o-, p-toluenesulfonamides.
(5) Cab-o-sil ® fumed silica (Cabot Corp.).
(6) Formica ® phenolic laminate (American Cyanamid Co.).

As illustrated in Table 1, thermoplastic adhesives of the present invention employing piperazine in combination with the polyoxypropylene polyamine (Examples I and III) exhibit greatly improved adhesive strength in bonding metals, wood and laminates.

EXAMPLES IV–VII

Four thermoplastic adhesive formulations were prepared employing the compounds in the amounts set forth in the following Table 2. The resinous polyamide reaction product compounds and adhesive formulations of Table 2 were prepared in accordance with the procedures described in Examples I–III. The polyoxypropylene diamine employed in Examples IV–VII was the same as that in Example I.

Table 2

| Example No. | IV | V | VI | VII |
|---|---|---|---|---|
| Resinous Polyamide Composition, moles: | | | | |
| JEFFAMINE ® D-400(1) | 1.0 | 0.75 | 0.50 | 0.30 |
| Piperazine | — | 0.30 | 0.50 | 0.70 |
| Isophthalic acid | 0.9 | 1.0 | 0.90 | 0.90 |
| Polyamide Resin Properties | | | | |
| Ball and ring softening point, °C. (ASTM E28-67) | 46 | — | 98 | 124 |
| Adhesive Formulation, grams | | | | |
| Polyamide | 100 | 100 | 100 | 100 |
| Epoxy resin(2) | 15 | 25 | 15 | 15 |
| N-Ethyl-o,p-toluene sulfonamide | 10 | 10 | 15 | 60 |
| Fumed silica | 1 | 1 | 1 | 1 |
| Adhesive Properties | | | | |
| Tensile shear strength (ASTM D1002-64T), lbs/in.$^2$ | | | | |
| Aluminum-to-aluminum | 510 | 1200 | 2590 | 2150 |
| Laminate-to-laminate(3) | 90 | 86 | 920 | 710 |

(1) A polyoxypropylene diamine having a molecular weight of 400, Jefferson Chemical Company, Inc.
(2) Liquid diglycidyl ether of bis-phenol A, epoxide equivalent weight 190.
(3) Formica ® phenolic laminate, American Cyanamid Co.

The results of Table 2 confirm the results set forth in Table 1 in regard to the improved adhesive strength of the invention thermoplastic adhesive compositions. Compare Examples II and IV to Examples I and V–VII. In addition, a comparison of the results of Examples V, VI and VII show that piperazine can be employed in amounts over a wide range with improved adhesive strengths being observed.

EXAMPLES VIII–X

Three additional thermoplastic adhesive formulations were prepared in accordance with the procedures described in Examples I–III utilizing the compounds in the amounts set forth in the following Table 3. The polyoxypropylene polyamine employed in Example II. The results of the following Table 3 further confirm the results set forth in Table 1.

Table 3

| Example No. | VIII | IX | X |
|---|---|---|---|
| Resinous Polyamide Composition, moles: | | | |
| JEFFAMINE ® D-230(1) | 1.01 | 0.71 | 0.52 |
| Piperazine | — | 0.30 | 0.50 |
| Isophthalic acid | 1.00 | 1.00 | 1.00 |
| Polyamide Resin Properties | | | |
| Ball and ring softening point, °C. (ASTM E28-67) | 118 | 133 | 159 |
| Adhesive Formulation, gms. | | | |
| Polyamide | 100 | 100 | 100 |
| Epoxy resin(2) | 15 | 15 | 15 |
| N-Ethyl-o,p-toluene sulfonamide | 45 | 45 | 75 |
| Fumed silica | 1 | 1 | 1 |
| Adhesive Properties | | | |
| Tensile shear strength (ASTM D1002-64T), lbs/in$^2$ | | | |
| Aluminum-to-aluminum | 1520 | 2450 | 2440 |

(1) A polyoxypropylene diamine having a molecular weight of 230, Jefferson Chemical Co, Inc.
(2) Liquid diglycidyl ether of bis-phenol A, epoxide equivalent weight 190.

Obviously, many modifications and variations of the invention as hereinbefore set forth may be made without departing from the spirit and scope thereof and, therefore, only such limitations should be imposed as are indicated in the claims.

We claim:

1. In a method of bonding two solid surfaces to each other by means of a bonding layer of a thermoplastic adhesive, the improvement which comprises utilizing as said adhesive a formulation comprising a plasticizer, compatible with a polyamide polymer, said polyamide polymer comprising: a resinous polyamide reaction product having a molecular weight less than about 10,000 and being prepared from a polyoxypropylene polyamine selected from the group consisting of diamines, triamines and mixtures thereof, and having an average molecular weight of about 190 to about 3,000, piperazine and an aliphatic or aromatic dicarboxylic acid, ester or anhydride having about 4 to about 20 carbon atoms per molecule.

* * * * *